(12) United States Patent
Doi

(10) Patent No.: US 10,713,581 B2
(45) Date of Patent: Jul. 14, 2020

(54) PARALLELIZATION AND SYNCHRONIZATION OF PROCEDURES TO ENABLE OVERHEAD HIDING

(71) Applicant: INTERNATIONAL BUSINESS MACHINES CORPORATION, Armonk, NY (US)

(72) Inventor: Jun Doi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 517 days.

(21) Appl. No.: 15/255,779

(22) Filed: Sep. 2, 2016

(65) Prior Publication Data

US 2018/0067894 A1    Mar. 8, 2018

(51) Int. Cl.
*G06F 9/455*    (2018.01)
*G06N 10/00*    (2019.01)
*G06F 9/52*    (2006.01)

(52) U.S. Cl.
CPC ............... *G06N 10/00* (2019.01); *G06F 9/52* (2013.01)

(58) Field of Classification Search
CPC .................................. G06N 10/00; G06F 9/52
See application file for complete search history.

(56) References Cited

U.S. PATENT DOCUMENTS

| | | | |
|---|---|---|---|
| 7,937,559 B1 * | 5/2011 | Parameswar | G06F 9/30014 712/36 |
| 8,375,392 B2 | 2/2013 | Becchi et al. | |
| 8,707,314 B2 | 4/2014 | Gummaraju et al. | |
| 8,990,827 B2 | 3/2015 | Wu et al. | |
| 2013/0091507 A1 * | 4/2013 | Wu | G06F 9/5038 718/104 |
| 2014/0149677 A1 * | 5/2014 | Jayasena | G06F 12/0862 711/137 |
| 2014/0240327 A1 | 8/2014 | Lustig et al. | |
| 2015/0206285 A1 * | 7/2015 | Pajak | G06T 5/002 382/265 |
| 2015/0277877 A1 * | 10/2015 | Feng | G06F 8/443 717/155 |
| 2016/0117152 A1 | 4/2016 | Baker | |

* cited by examiner

*Primary Examiner* — James J Lee

(74) *Attorney, Agent, or Firm* — Tutunjian & Bitetto, P.C.; Vazken Alexanian

(57) ABSTRACT

A computer-implemented method is provided for hiding overheads on a parallel computing platform. The computer-implemented method includes loading a first kernel overhead and a second kernel overhead in a queue of a second thread, and loading a dummy kernel overhead between the first and second kernel overheads in the queue of second thread. The computer-implemented method further includes loading a waiting process in the queue of a first thread, the waiting process remaining active until a previous kernel of the first and second kernel overheads ends. The computer-implemented method furthers include allocating memory copy overheads related to the previous kernel in the queue of the first thread and allocating a stop process in the queue of the first thread, the stop process configured to stop a dummy kernel, the dummy kernel related to the dummy kernel overhead.

20 Claims, 12 Drawing Sheets

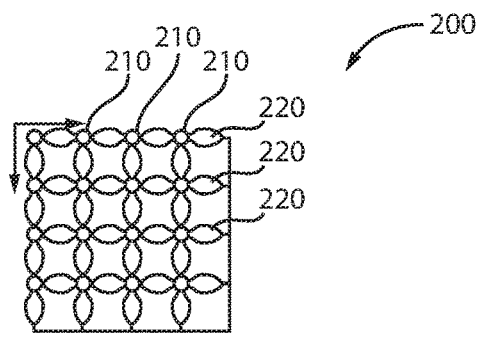

FIG. 2

| Node | IBM Power System S822LC |
|---|---|
| CPUs | 2xPOWER8 processor |
| CPU dock rate | 2.92 GHz |
| CPU cores | 10 cores per socket |
| CPU peak performance | 233.6 GFlops per socket |
| Memory | 512 GB |
| Memory bandwidth | 115 GB/s |
| GPUs | 2xNVIDIA Tesla K80 |
| CUDA toolkit | Version 7.5 |
| Inter node connection | Infiniband EDR |
| MPI | IBM Parallel Environment |
| OS | Red Hat Enterprise Linux 7.2 |

FIG. 3

*Send gauge multiplied half-spinors to positive neighbor*

*Send half-spinors to negative neighbor*

FIG. 4

```
OUT = R = S = IN
rhop = alpp = omgp = 1.0
P = D(S)
RH = R = R-P
P = V = 0.0
do until rr is not small enough
  rho = dot(R,RH)
  bet = rho*alpp/(rhop*omgp)
  P = bet*P - omgp*bet*V + R
  V = D(P)
  aden = dot(V,RH)
  alp = rho / aden
  S = -alp*V +R
  T = D(S)
  omgn = dot(T,S)
  omgd = dot(T,T)
  omg = omgn/omgd
  OUT = OUT +omg*S + alp*P
  R = -omg*T + S
  rr = dot(R)
  rhop = rho
  alpp = alp
  omgp = omg
enddo
```

Data dependency
K2->M1->M2
K3, M2->K4
Result of K5 is reduced on host and send to K6
D is dummy kernel to wait reduced value

PARALLELIZATION AND SYNCHRONIZATION OF PROCEDURES TO ENABLE OVERHEAD HIDING

BACKGROUND

Technical Field

The present invention relates generally to data processing systems and methods, and more specifically, to parallelization and synchronization of procedures to enable overhead hiding.

Description of the Related Art

Heterogeneous computing systems use more than one kind of processor. In a heterogeneous computing system employing a central processing unit (CPU) and a graphics processing unit (GPU), computational kernels can be offloaded from the CPU to the GPU in order to improve, e.g., the runtime, throughput, or performance-per-watt of the computation as compared to the original CPU implementation. Although effective at increasing the performance of many throughput-oriented computational kernels, there is an overhead cost involved in offloading computational kernels from a CPU to a GPU.

Lattice quantum chromodynamics (QCD) is a challenging computer simulation for supercomputers to perform. It reproduces physical phenomena more precisely as supercomputers shift from petascale to exascale, but highly optimized codes are still difficult to handle if the computational capability and capacity are to be fully utilized with the limited time and power available. Hybrid supercomputer systems with accelerators such as GPUs have become common because of their high density and low energy consumption.

SUMMARY

In accordance with an embodiment, a computer-implemented method for hiding overheads on a parallel computing platform is provided. The computer-implemented method includes loading a first kernel overhead and a second kernel overhead in a queue of a second thread and loading a dummy kernel overhead between the first and second kernel overheads in the queue of second thread. The computer-implemented method further includes loading a waiting process in the queue of a first thread, the waiting process remaining active until a previous kernel of the first and second kernel overheads ends. The computer-implemented method further includes allocating memory copy overheads related to the previous kernel in the queue of the first thread and allocating a stop process in the queue of the first thread, the stop process configured to stop a dummy kernel, the dummy kernel related to the dummy kernel overhead.

In accordance with another embodiment, a system for hiding overheads on a parallel computing platform is provided. The system includes a memory and a processor in communication with the memory, wherein the processor is configured to load a first kernel overhead and a second kernel overhead in a queue of a second thread, and load a dummy kernel overhead between the first and second kernel overheads in the queue of second thread. The processor is further configured to load a waiting process in the queue of a first thread, the waiting process remaining active until a previous kernel of the first and second kernel overheads ends, allocate memory copy overheads related to the previous kernel in the queue of the first thread, and allocate a stop process in the queue of the first thread, the stop process configured to stop a dummy kernel, the dummy kernel related to the dummy kernel overhead.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The following description will provide details of preferred embodiments with reference to the following figures wherein:

FIG. 2 is a data layout of lattice sites in a 2D example of a 4×4 lattice, in accordance with an embodiment of the present invention;

FIG. 3 is a table of OpenPOWER cluster specifications for multiple node performance tests, in accordance with an embodiment of the present invention;

FIG. 4 illustrates boundary data exchange in distributed memory parallelization of a Wilson-Dirac kernel, in accordance with an embodiment of the present invention;

Throughout the drawings, same or similar reference numerals represent the same or similar elements.

DETAILED DESCRIPTION

Figure 1:
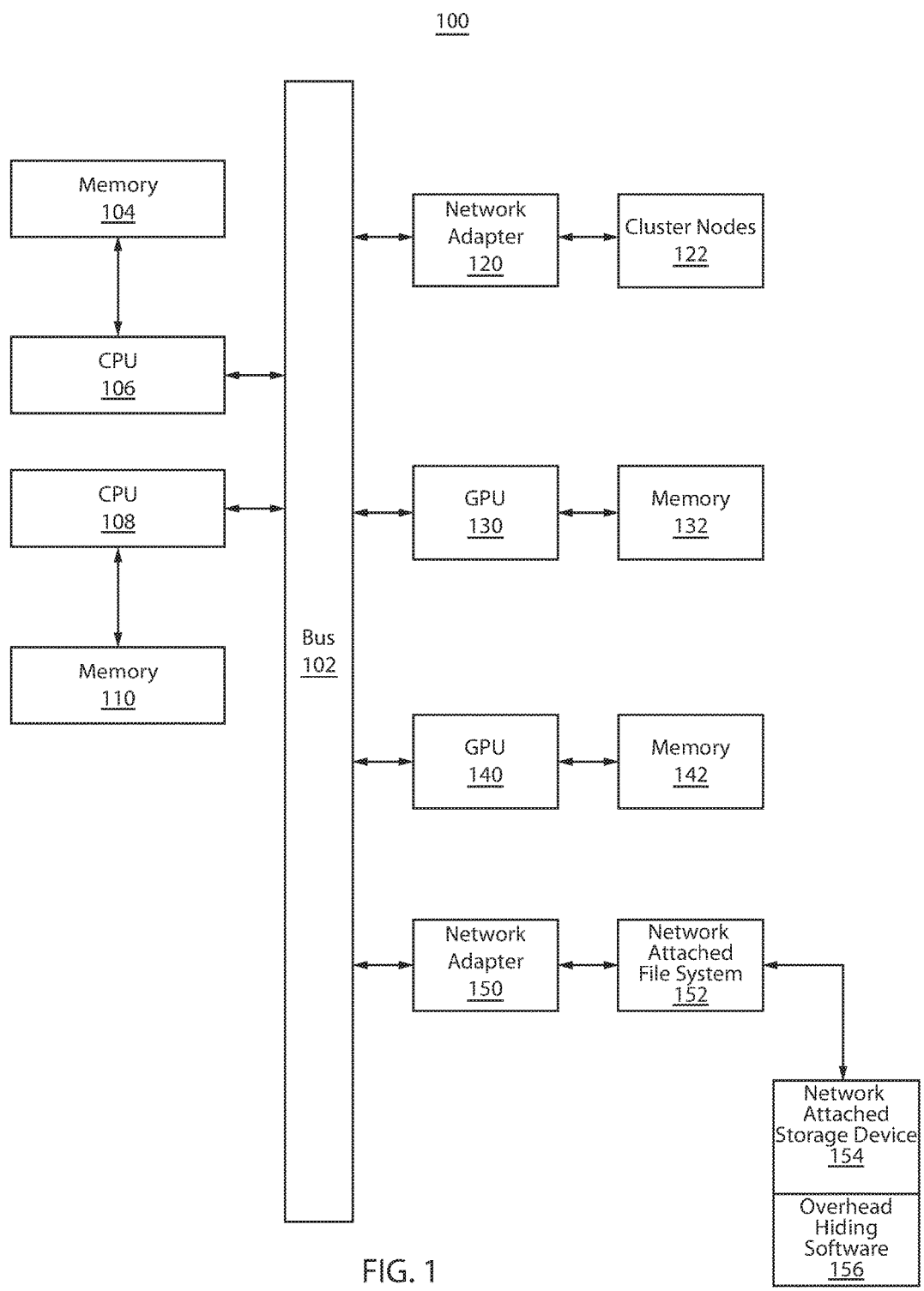
FIG. 1 is a block/flow diagram of an exemplary computing system for hiding overheads, in accordance with an embodiment of the present invention.

In one or more embodiments, parallelization and synchronization of procedures between a CPU and GPU for overhead hiding is presented. The example embodiments refer to LQCD (lattice quantum chromodynamics), which is presented for illustrative purposes only and is not meant to be a limitation of the present invention. Therefore, the embodiments of the present disclosure are not limited to LQCD. The overhead hiding described herein can be applied to any types of kernels related to any types of applications/implementations or configurations/systems. Other systems may have kernel models that deviate from the one described below with reference to LQCD. Thus, the overhead hiding implementations described herein are not limited to the field of LQCD. Instead, the overhead hiding can be applied to any type of hardware/software implementations contemplated by one skilled in the art.

In a non-limiting example, an LQCD implementation is described, where LQCD is the discretization of a theory of strong force among quarks that is commonly used for simulations on supercomputers. Lattice QCD simulations are among the most time-consuming applications on supercomputers, requiring huge computational power and high memory bandwidth for the precise simulations necessary to reproduce physical phenomena on the computer. As supercomputer systems start moving from petascale to exascale, more precise simulations are expected to start replacing physical experiments for revealing undiscovered physical phenomena and unresolved issues related to the Higgs boson, dark matter, and the origin of the universe.

For example, lattice QCD simulation requires huge computational power, high memory, and high network bandwidth, making it a challenge for supercomputers. Of course, other simulations not related to LQCD can also require huge computational power and benefit from the overhead hiding techniques described herein. With that said, it is no exaggeration to say that lattice QCD has been accelerating the evolution of supercomputers. Many supercomputers are being developed to accommodate lattice QCD simulations, which have influenced the architectures of some. For example, QCDPAX, QCDSP, QCDOC, and QPACE have been designed and optimized for lattice QCD simulations with great success. The Blue Gene/L supercomputer, while following the design concepts and architectures of QCDOC, is also being developed as a general purpose supercomputer.

Today's supercomputer trends are becoming more general, focusing on common architectures or architectures similar to consumer products. Green computing, with its emphasis on decreasing the power consumption of large-scale supercomputer systems, is another big trend. One major trend in exascale supercomputing is a hybrid architecture featuring accelerators outside of the host CPU cores (e.g., many core chips, FPGAs, or GPUs), and many hybrid systems are ranked on the Top 500 and Green 500 lists. In one or more embodiments, hybrid GPU systems are described by examining the optimization of lattice QCD simulations on, e.g., NVIDIA's Kepler architecture GPUs.

The OpenPOWER Foundation has introduced a new generation of supercomputing with a new open architecture based on a hybrid system combining an IBM POWER processor with NVIDIA Tesla GPUs, and the CORAL collaboration has announced that two large supercomputer systems (SIERRA and SUMMIT) will be built with Open-POWER clusters. The first generation of the OpenPOWER cluster has IBM POWER8 processors and, e.g., NVIDIA's Kepler architecture GPUs that support little endian Linux, so the environment is very similar to conventional GPU clusters. The second generation of OpenPOWER cluster will appear with IBM POWER8 processors and NVIDIA's Pascal architecture GPUs connected via NVLink, which is a new high-speed interconnect link with more bandwidth than PCI Express.

In one example, lattice QCD simulations require huge computational power and high memory bandwidth in limited power consumption, so GPUs are greatly advantageous to accelerate them. Of course, other simulations not related to LQCD can also require huge computational power and benefit from accelerators, such as GPUs. Many lattice QCD implementations and optimization techniques on GPUs have been introduced. QUDA is one implementation, exploiting the computational capability of GPUs.

Previous works have shown that the computational efficiency of lattice QCD kernels running on GPUs is relatively lower than that of kernels running on conventional CPU cores. For example, 30-50% of peak performance has been observed on Blue Gene supercomputers, while QCD kernels on a GPU lattice run at around, e.g., 10% of peak performance. This is because the memory bandwidth is not sufficient for the high computational power of GPUs in the lattice QCD kernel. In one or more embodiments, efforts were placed on maximizing the memory bandwidth and examining various optimization techniques to determine what is most efficient for GPUs. It was determined that array alignment is significant when it comes to supplying data from the global memory efficiently. Thus, in one or more embodiments, an optimal algorithm is presented for the innermost loop calculation that maintains data alignment for various types of simulations.

In one or more embodiments, performance optimization of lattice QCD for OpenPOWER clusters is performed, which are hybrid systems built with IBM POWER processors and NVIDIA Tesla GPUs. Lattice QCDs are optimized and run on the OpenPOWER cluster product, which has POWER8 processors and Tesla GPUs on the nodes. Also, CUDA overheads that degrade the performance of small lattice problems are considered. In one or more embodiments, an overlap method is presented for using multiple threads and CUDA streams to hide CUDA overheads behind computation on GPU. By using this technique, strong scaling is improved by using multiple nodes and GPUs. "CUDA" is a parallel computing platform and application programming interface (API) model created by NVIDIA. It allows software developers and software engineers to use a CUDA-enabled graphics processing unit (GPU) for general purpose processing, an approach known as "GPGPU."

Referring now to the drawings in which like numerals represent the same or similar elements and initially to FIG. 1, a block/flow diagram of an exemplary computing system for hiding overheads on a parallel computing platform is presented, in accordance with an embodiment of the present invention.

An exemplary overhead hiding processing system 100 to which the present description can be applied is shown in accordance with one embodiment. The overhead hiding processing system 100 includes at least a first memory 104, a first central processing unit (CPU) 106, a second memory 108, and a second CPU 110 operatively coupled to other components via a system bus 102. A network adapter 120, a first graphics processing unit (GPU) 130, a second GPU 140, and a network adapter 150, are operatively coupled to the system bus 102.

Cluster nodes 122 are operatively coupled to system bus 102 by the network adapter 120. A memory 132 is operatively coupled to system bus 102 by the first GPU 130. A memory 142 is operatively coupled to system bus 102 by the second GPU 140. A network attached file system 152 is operatively coupled to system bus 102 by the network adapter 150. Additionally, a network attached storage device 154 and overhead hiding software 156 is also operatively coupled to the network adapter 150. In one example, the server nodes of a cluster can be controlled remotely, the overhead hiding program can be loaded from network storage to the memory of the GPU, and the kernel program can be loaded to the memory of the GPUs.

Of course, the overhead hiding processing system 100 can also include other elements (not shown), as readily contemplated by one of skill in the art, as well as omit certain elements. Further the overhead hiding processing system 100 is not limited to LQCD simulations, but can be applied to any other types of simulations not related to LQCD. Moreover, various other input devices and/or output devices can be included in the overhead hiding processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the overhead hiding processing system 100 are readily contemplated by one of ordinary skill in the art given the teachings of the present description provided herein.

FIG. 2 is a data layout 200 of lattice sites in a 2D example of a 4×4 lattice, in accordance with an embodiment of the present invention.

In one non-limiting example, the overhead hiding is described with respect to LQCD. Of course, one skilled in the art may contemplate applying overhead hiding to other types of systems and implementations. Lattice QCD is a field theory that calculates the strong force of quarks and gluons in a 4D space and time domain on a computer. The 4D space and time is discretized in a 4D lattice, and the physical parameters of quarks are placed on the lattice sites while the gluons are placed as links of the lattice sites.

In a lattice QCD simulation, quarks on the lattice sites are exchanged with gluons by a stencil calculation and linear equations are solved by an implicit method, such as the conjugate gradient method (CGM). In the CGM iterations, the interactions between quarks and gluons are calculated frequently, making the CGM calculations the heaviest kernel routine of the lattice QCD simulation.

Various kernels can be used to calculate the interactions in lattice QCD simulations. In one or more embodiments, as a non-limiting example, the Wilson-Dirac kernel is used, as it relates to multiple implementations. Of course, any types of kernels can be used, including, but not limited to, microkernels, monolithic kernels, hybrid kernels, nanokernels, exokernels, etc. used in any types of systems and implementations.

The Wilson-Dirac kernel calculates the quark exchange among eight neighboring lattice sites in four-dimensional space and time.

The Wilson-Dirac kernel D is defined by:

$$D(n) = \delta(n) - \kappa \cdot \sum_{\mu=1}^{4} \{(1-\gamma_\mu)U_\mu(n)\delta(n+\hat{\mu}) + (1+\gamma_\mu)U_\mu^\dagger(n-\hat{\mu})\delta(n-\hat{\mu})\} \quad (1)$$

where $\delta(n)$ is a quark (spinor) containing four spins with three colors each defined by complex numbers, U (n) is a gluon matrix (gauge matrix) containing 3×3 complex number elements, and $\gamma$ is a gamma matrix containing 4×4 matrix elements, defined in Eq. 2. The $\mu$ is 1, 2, 3, or 4 corresponding to the X-, Y-, Z-, or T-dimension, and $\pm\mu$ indicates which of the eight neighbors it refers to.

$$\gamma_1 = \begin{pmatrix} 0 & 0 & 0 & -i \\ 0 & 0 & -i & 0 \\ 0 & i & 0 & 0 \\ i & 0 & 0 & 0 \end{pmatrix} \quad \gamma_2 = \begin{pmatrix} 0 & 0 & 0 & -1 \\ 0 & 0 & 1 & 0 \\ 0 & 1 & 0 & 0 \\ -1 & 0 & 0 & 0 \end{pmatrix} \quad (2)$$

$$\gamma_3 = \begin{pmatrix} 0 & 0 & -i & 0 \\ 0 & 0 & 0 & i \\ i & 0 & 0 & 0 \\ 0 & -i & 0 & 0 \end{pmatrix} \quad \gamma_4 = \begin{pmatrix} 1 & 0 & 0 & 0 \\ 0 & 1 & 0 & 0 \\ 0 & 0 & -1 & 0 \\ 0 & 0 & 0 & -1 \end{pmatrix}$$

In Equation 1, the 3×3 matrix and four spins are multiplied with three colors for eight neighboring lattice sites and are reduced by multiplying $-\kappa$ to the spins of the focused lattice site. The matrix multiplications can be halved by using symmetry in the gamma matrices. Equation 3 shows an example for the X+ direction ($\mu$=+1), where two pairs of the same matrix and spin multiplications (h1, h2) are presented:

$$(1-\gamma_1)U_1(n)\delta(n+1,m) = \begin{pmatrix} U_1(n)\cdot(s_1+i\cdot s_4) \\ U_1(n)\cdot(s_2+i\cdot s_3) \\ -i\cdot U_1(n)\cdot(s_2+i\cdot s_3) \\ -i\cdot U_1(n)\cdot(s_1+i\cdot s_4) \end{pmatrix} = \begin{pmatrix} U_1(n)\cdot h_1 \\ U_1(n)\cdot h_2 \\ -i\cdot U_1(n)\cdot h_2 \\ -i\cdot U_1(n)\cdot h_1 \end{pmatrix} \quad (3)$$

This technique is also used for data compression to exchange boundaries between neighboring processes. A pair of two spins is referred to as a half-spinor. The calculation of the Wilson-Dirac kernel for each direction is performed as follows: (1) Half-spinor construction: 12 flops (0 for T-dimension), (2) Gauge matrix and half-spinor multiply: 132 flops, and (3) Spinor reduction: 48 flops (24 flops for T-dimension).

The flop counts of the Wilson-Dirac kernel per lattice site are calculated as 1,464 by adding the flop counts for all three of these steps. While calculating 1,464 floating operations, eight gauge matrices and nine spinors are loaded and one spinor is stored. The Wilson-Dirac kernel requires 1.97 bytes/flop in double precision, thus its performance is limited by the memory bandwidth.

In one or more embodiments, the Wilson-Dirac kernel with even-odd preconditioning is used, as this enables the CGM iteration to converge faster. In the even-odd preconditioning, lattice sites are separated into even and odd sites, and calculated independently in the Wilson-Dirac kernel. Thus, the Wilson-Dirac kernel is performed in two phases: first from even to odd sites and then from odd to even sites. Equation 1 is rewritten as Equation 4, where d is the Wilson-Dslash term:

$$D(n)=\delta(n)-\kappa\cdot d(n) \quad (4)$$

The Wilson-Dirac kernel for the even-odd preconditioning is then defined in Equation 5:

$$D(n)=\delta(n)-\kappa\cdot d\_oe(-\kappa\cdot d\_eo(n)) \quad (5)$$

The flop count of the Wilson-Dirac kernel with even-odd preconditioning is 1,440 per lattice site, requiring 1.86 bytes/flop in double precision. The required bandwidth of the even-odd kernel is actually larger because the full site kernel refers to the same gauge matrix twice so that it can be cached, but each gauge matrix is only referred to once in the even-odd kernel. This makes the performance efficiency of the even-odd Wilson-Dirac kernel relatively less than that of the full site kernel in general.

There are two physical parameters of the data layout 200, that is, spinors 210 defined on the lattice sites and gauge matrices 220 defined on the link of the lattice sites. For each lattice site, a spinor has twelve (12) complex numbers and a gauge matrix has nine (9). The gauge matrices for positive links on the lattice sites can be stored in, e.g., separate storage unit.

There are two data forms to store structures: array of structure (AoS) and structure of arrays (SoA). Previously, spinors and gauge matrices were stored in the AoS form for optimized Blue Gene supercomputer implementations because this form can efficiently exploit cache memory to handle continuous data elements in the structures. The SoA form, however, is better suited for GPU computing, and many applications running on GPUs use this form to store data structures because it can supply continuous elements in arrays to the streaming multiprocessors. The SoA form is also used in a common optimization technique called "coalescing," which is used in many GPU applications. Therefore, in one or more embodiments, the SoA form is used to store spinors and gauge matrices to optimize the Wilson-Dirac kernel on the Kepler GPU. In one example, all the elements are packed in a 1D array with an X, Y, Z, T order.

FIG. 3 is a table 300 of OpenPOWER cluster specifications for multiple node performance tests, in accordance with an embodiment of the present invention.

Parallelizing lattice QCD simulation on a cluster with multiple GPUs and nodes shortens the simulation time or enables solving more large scale problems. In the following embodiments, the Wilson-Dirac kernel and CG solver are parallelized by using MPI (message passing interface) on the OpenPOWER cluster, where the detailed specifications of the cluster are shown in the table 300 of FIG. 3.

FIG. 4 illustrates boundary data exchange 400 in distributed memory parallelization of a Wilson-Dirac kernel, in accordance with an embodiment of the present invention.

To parallelize the Wilson-Dirac kernel, array decomposition is applied to divide the lattice into small domains for each distributed memory space. The lattice is divided in the Y, Z, and T dimensions and not divided in the X dimension because the X dimension is the innermost part of the array and the boundary data collection there is not of sequential access that causes performance loss. In one example, one MPI task is allocated per GPU so that each MPI task manages one GPU. In one or more embodiments, four MPI tasks are used per node because two Tesla K80 per node are used, and each Tesla K80 physically includes two GPUs. In the Wilson-Dirac kernel, each lattice site refers to eight neighboring lattice sites, so boundary sites on the decomposed lattice need to be copied to neighboring memory spaces. In FIG. 4, the boundary data is stored as a half-spinor array and the gauge matrix is multiplied before the data exchange for the negative-direction calculation. When the decomposed lattice is allocated on a GPU, the boundary data exchange is utilized between GPUs on the same node or between GPUs on the different nodes via MPI.

Figures 5, 6:
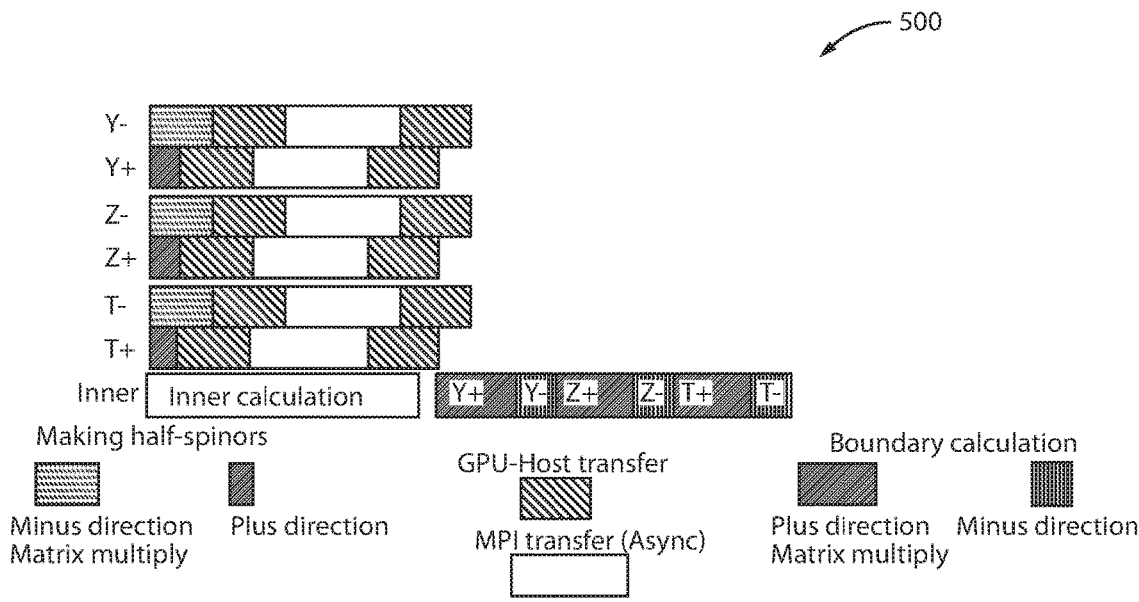
FIG. 5 is an overlapping calculation and boundary data transfer of a Wilson-Dirac kernel using CUDA streams, in accordance with an embodiment of the present invention.
FIG. 6 is pseudocode for implementing an algorithm of the BiCGStab method, in accordance with an embodiment of the present invention.

FIG. 5 is an overlapping calculation and boundary data transfer 500 of a Wilson-Dirac kernel using CUDA streams, in accordance with an embodiment of the present invention.

To hide data transfer latency, data transfer and calculations are overlapped by using cudaMemcpyAsync and CUDA streams. CUDA streams are used in two ways: (i) for the boundary calculation and data transfer for positive and negative directions, and (ii) for the calculation of inner lattice sites and boundary sites after receiving them from neighbors.

FIG. 6 is pseudocode 600 for implementing an algorithm of the BiCGStab method, in accordance with an embodiment of the present invention.

In the evaluation of the Wilson-Dirac kernel, a CG solver is implemented running on multiple GPUs and multiple nodes. Of the many variations of CGM used for lattice QCD simulations, the BiCGStab method is chosen for the evaluation according to the one or more embodiments. The algorithm of the BiCGStab method is shown by the example pseudocode 600 of FIG. 6, where the upper-case variables are spinor arrays, the lower-case variables are scalar numbers, and "D" is a Wilson-Dirac kernel.

All calculations in the BiCGStab loop are executed on GPUs, so all spinor arrays and the gauge matrix array are allocated and stored on the global memory of a GPU. The input spinor array and gauge matrix array are transferred to the GPU at the top of the solver and then transferred to the output spinor array from the GPU at the end of the solver. Aside from the Wilson-Dirac kernel and dot product routine, no data from the GPU needs to be transferred during the CG iterations. Linear algebra routines are implemented in CUDA kernels and other scalar calculations on the host (CPU) node. The same number of threads are used and the same number of thread blocks as for the Wilson-Dirac kernel so that aligned spinor arrays in the linear algebra routines can be loaded and stored.

Figure 7:
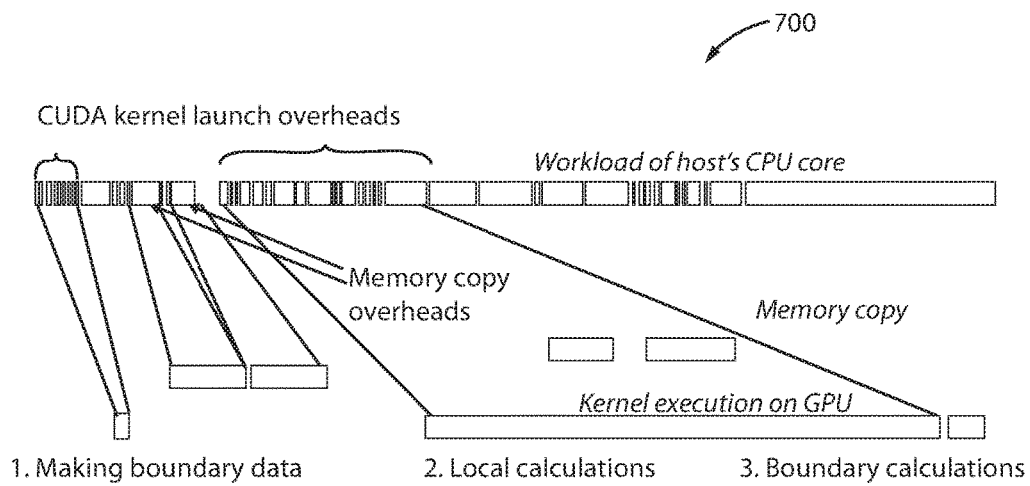
FIG. 7 is large CUDA overhead observed from a visual profiler's result of $16^3 \times 32$ lattice, in accordance with an embodiment of the present invention.
Figure 8:
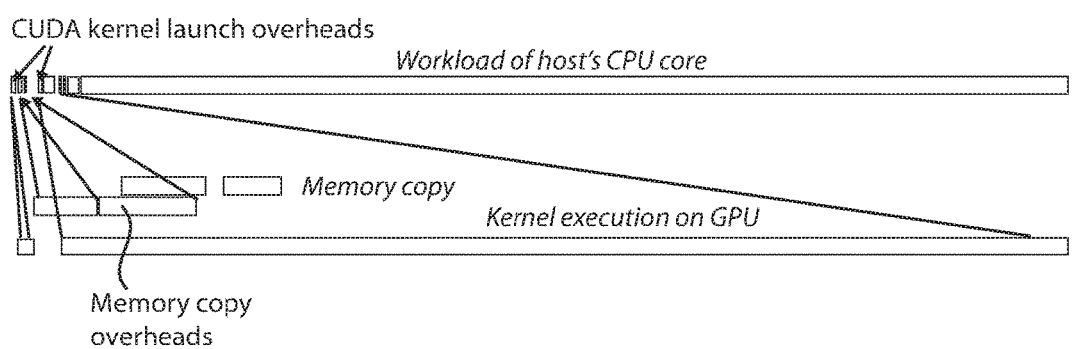
FIG. 8 is ignorable small CUDA overhead observed from a visual profiler's result of $32^3 \times 64$ lattice, in accordance with an embodiment of the present invention.

FIG. 7 is large CUDA overhead 700 observed from a visual profiler's result of $16^3 \times 32$ lattice, in accordance with an embodiment of the present invention, whereas FIG. 8 is ignorable small CUDA overhead 800 observed from a visual profiler's result of $32^3 \times 64$ lattice, in accordance with an embodiment of the present invention.

When offloading workloads to the GPU, the host's CPU core controls data flow and work flow are transferred to the GPU. By using CUDA stream, memory copy to and from GPU, and kernel execution on the GPU are done asynchronously without blocking the host's CPU core. However, when the CUDA stream is used, there are overheads of preparation of data or parameters to enqueue memory copy or kernel execution on the CUDA stream, which blocks CPU core. There are CUDA overheads before executing memory copy, kernel execution, stream managements and synchronization loaded on the host's CPU core. In the practical CUDA tuning technique, it is recommended to make the problem size large enough to ignore the CUDA overheads. However, the problem size cannot always be enlarged. One example is a strong scaling performance degradation on multiple GPUs and multiple nodes, because the problem size gets smaller when a large number of nodes and GPUs is used because the CUDA overheads get relatively larger.

FIGS. 7 and 8 show the relative difference of CUDA overheads between different sizes of lattice (small v. large). The difference is observed by using, e.g., NVIDIA's visual profiler on one (1) node of OpenPOWER cluster, shown in FIG. 3. FIGS. 7 and 8 show one example execution of the Wilson-Dirac kernel with boundary data exchange between GPUs. In one example, there are three CUDA kernel calls: (1) making boundary data in half-spinor form, (2) Wilson-Dirac calculation for inner lattice sites, and (3) calculation for boundary sites. The boundary data exchange is performed via the host's memory so that boundary data is copied from the GPU to the host's memory and then copied to the destination GPU. These memory copies can be overlapped on the local calculation (2). However for a $16^3 \times 32$ lattice, some memory copies are not overlapped because of large CUDA overheads that block the CPU core. Also in FIG. 7, long unused GPU times are observed that cause performance loss. FIG. 8, in comparison, shows small unused GPU time and that most of the memory copies are overlapped on local calculation.

Figure 9:
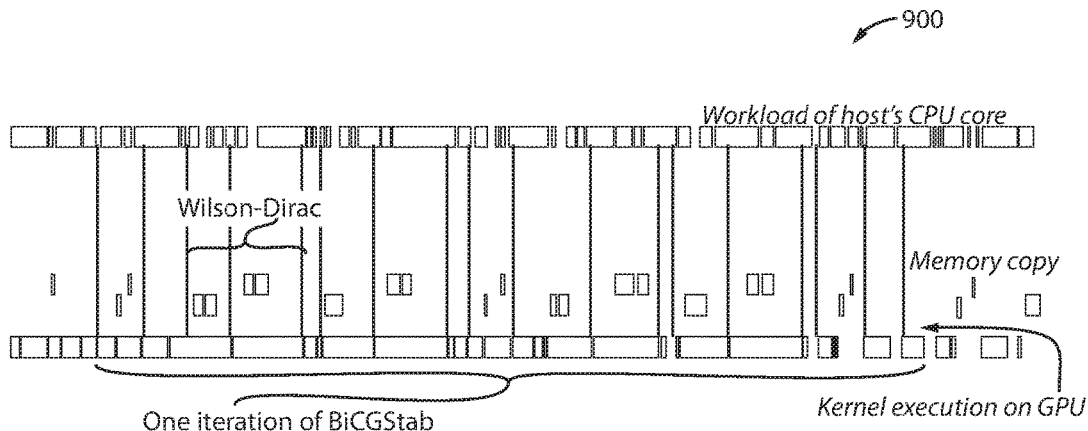
FIG. 9 is a naïve implementation of a BiCGStab solver observed from a visual profiler's result of a $16^3 \times 32$ lattice, in accordance with an embodiment of the present invention.

FIG. 9 is a naïve implementation of a BiCGStab solver 900 observed from a visual profiler's result of a $16^3 \times 32$ lattice, in accordance with an embodiment of the present invention.

Since large CUDA overheads cannot be avoided for small lattice size issues, overlapping of overheads behind the kernel execution on the GPU is implemented. While the CUDA stream queue is not empty, queued kernel executions and memory copies are performed without blocking the host's CPU core, thus putting the CUDA overheads for the future kernel execution. It is difficult to overlap these overheads by considering only the Wilson-Dirac kernel, but there is much space to overlap by considering a BiCGStab iteration. The cudaStreamSynchronize function can be called to wait until all the workloads on the CUDA stream are finished at the end of each procedure, as shown in FIG. 9.

In this case, CUDA overheads appear at the beginning of each procedure and each kernel execution starts just after overhead. However, in most cases, the function cudaStreamSynchronize is not required at the end of the procedures because continuous kernels queued on the same CUDA stream are executed sequentially in a FIFO manner. Therefore, most of the function cudaStreamSynchronize can be removed and then CUDA overheads appearing at the beginning of the procedures can be overlapped behind previous kernel execution, except for the case when synchronization between the GPU and the host (CPU) is necessary, for example, collective operations between GPUs or MPI communications. Multiple streams can be synchronized on the same GPU or other GPUs without stopping the CUDA stream by using CUDA event APIs. However, CUDA streams and workloads on the host (CPU) cannot be synchronized. Therefore, in that case, a new synchronization method is proposed to prevent blocking the host's CPU core.

Figure 10:
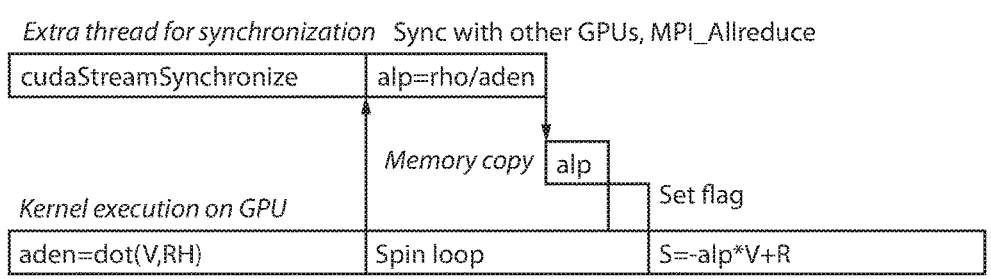
FIG. 10 is an example of using a spin loop kernel, where a value reduction on the host is required in next kernel execution in a BiCGStab iteration, in accordance with an embodiment of the present invention.

FIG. 10 is an example of using a spin loop kernel 1000, where a value reduction on the host is required in next kernel execution in a BiCGStab iteration, in accordance with an embodiment of the present invention.

To overlap overheads, workloads need to be enqueued on the CUDA stream before the CUDA stream is in a "not empty" state. However, if the workload requires some data prepared on the host, that workload cannot be enqueued on the CUDA stream before the data is ready. A special kernel with spin loop is introduced on the CUDA stream to wait the data to be ready, and then continuing kernels can be enqueued without blocking the host (CPU). To finish the spin loop kernel, another special kernel is executed to set the flag when the data is ready on the host (CPU). An extra thread is added or created on the host (CPU) to prepare the data required for the next kernel execution and to launch the special kernel to set the flag to finish the spin loop kernel.

Figure 11:
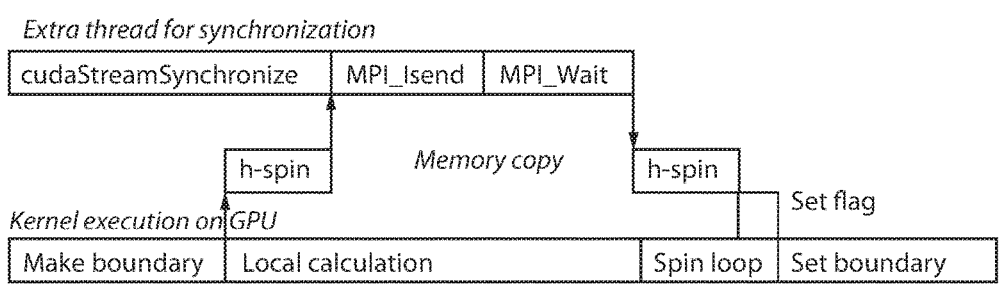
FIG. 11 is an example of using a spin loop kernel, where boundary data from another node is used in the next kernel execution in the Wilson-Dirac kernel, in accordance with an embodiment of the present invention.

FIG. 11 is an example of using a spin loop kernel 1100, where boundary data from another node is used in the next kernel execution in the Wilson-Dirac kernel, in accordance with an embodiment of the present invention.

FIGS. 10 and 11 are examples of workflow diagrams of GPU and host (CPU) synchronization using a spin loop kernel, an extra thread that appears in the BiCGStab solver, and the Wilson-Dirac kernel. In FIG. 10, a result of a dot product of two vectors is required as the next linear algebra which should be summed with all the GPUs on the node and also on the other nodes. Therefore, the result is calculated on the host and the CUDA stream is blocked with spin loop kernel until the result is stored in the memory on the GPU. In FIG. 11, boundary data is exchanged between GPUs on different nodes by using, e.g., MPI communication. The kernel for the Wilson-Dirac calculation of the boundary lattice sites is blocked with the spin loop kernel until the boundary data is received on the host (CPU) and stored in the memory on the GPU.

Figure 12:
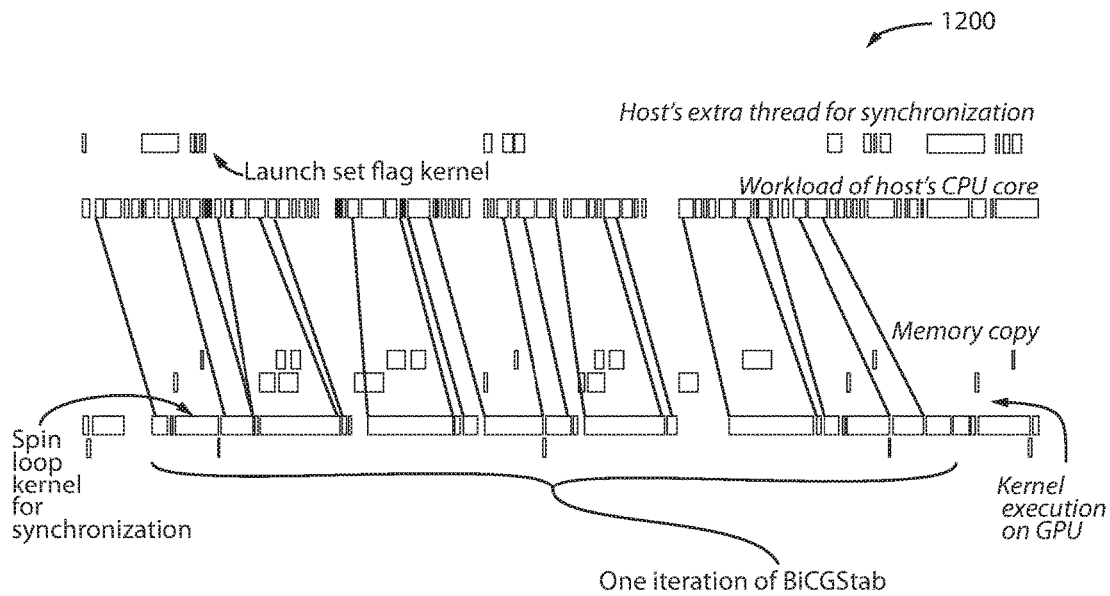
FIG. 12 is an example of an overhead hiding implementation of a BiCGStab solver observed from a visual profiler's result of a $16^3 \times 32$ lattice, in accordance with an embodiment of the present invention.

FIG. 12 is an example of an overhead hiding implementation 1200 of a BiCGStab solver observed from a visual profiler's result of a $16^3 \times 32$ lattice, in accordance with an embodiment of the present invention.

With a spin loop kernel and an extra thread on the host (CPU), workloads can be enqueued without synchronization and CUDA overheads can be overlapped behind kernel execution time. FIG. 12 shows the effect of overlapping of overheads for small lattice sizes. Most of the kernels and memory copies are previously enqueued on the CUDA stream and overlapped by other kernel execution.

Figure 13:
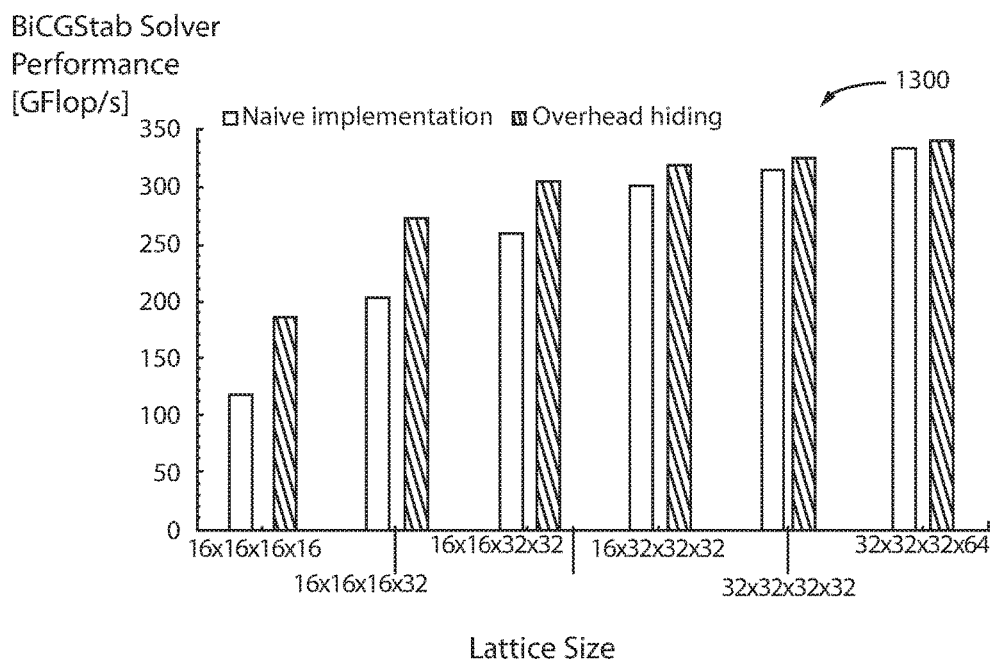
FIG. 13 is a graph of an example of a single node performance comparison of the BiCGStab solver with naïve and overhead hiding implementations on the OpenPOWER node (S822LC), in accordance with an embodiment of the present invention.

FIG. 13 is a graph 1300 of an example of a single node performance comparison of the BiCGStab solver with naïve and overhead hiding implementations on the OpenPOWER node (S822LC), in accordance with an embodiment of the present invention.

The performance of the naïve and the overhead hiding implementations were compared by using an OpenPOWER cluster shown in FIG. 3. The overall performance of the BiCGStab solver is compared, because the elapsed time of the Wilson-Dirac kernel cannot be measured without synchronization of the CUDA stream. FIG. 13 provides a comparison of sustained performance of the BiCGStab solver by using one node of the, e.g., S822LC cluster. By using the overhead hiding implementation, greater performance improvements are obtained for smaller lattice size. An improvement of 56% is gained for a 164 lattice size and an improvement of 33% is gained for a $16^3 \times 32$ lattice size.

Figure 14:
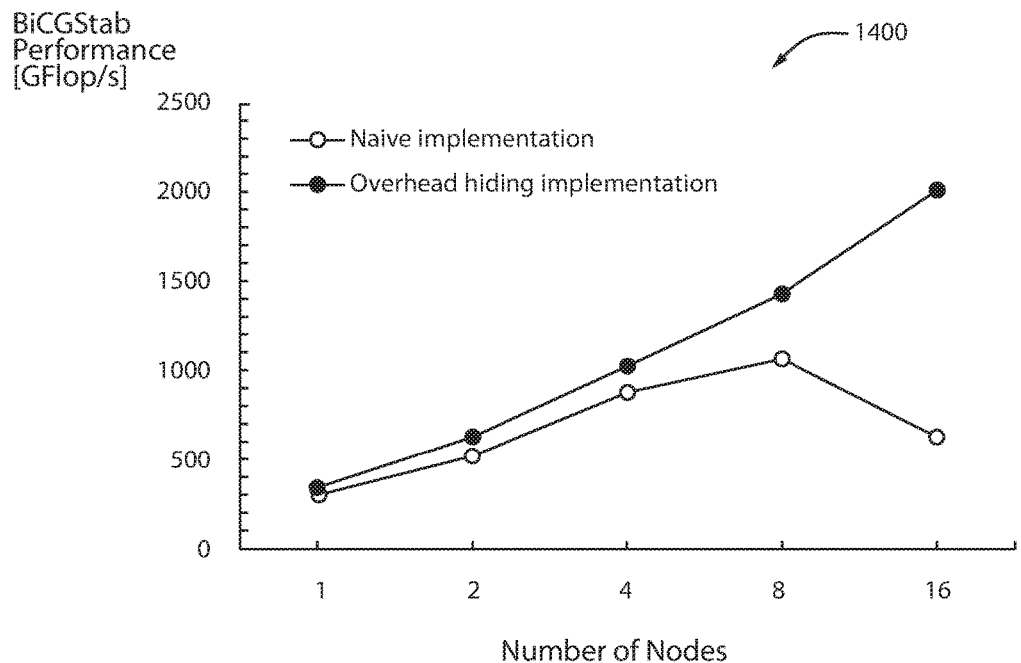
FIG. 14 is a graph illustrating strong scaling of BiCGStab solver performance of a $32^3 \times 64$ lattice with naïve and overhead hiding implementations on the OpenPOWER cluster, in accordance with an embodiment of the present invention.

FIG. 14 is a graph 1400 illustrating strong scaling of BiCGStab solver performance of a $32^3 \times 64$ lattice with naïve and overhead hiding implementations on the OpenPOWER cluster, in accordance with an embodiment of the present invention.

The performance of the BiCGStab solver is compared by using multiple nodes on the OpenPOWER cluster. As shown, strong scaling is improved by using the overhead hiding implementation described herein.

Figure 15:
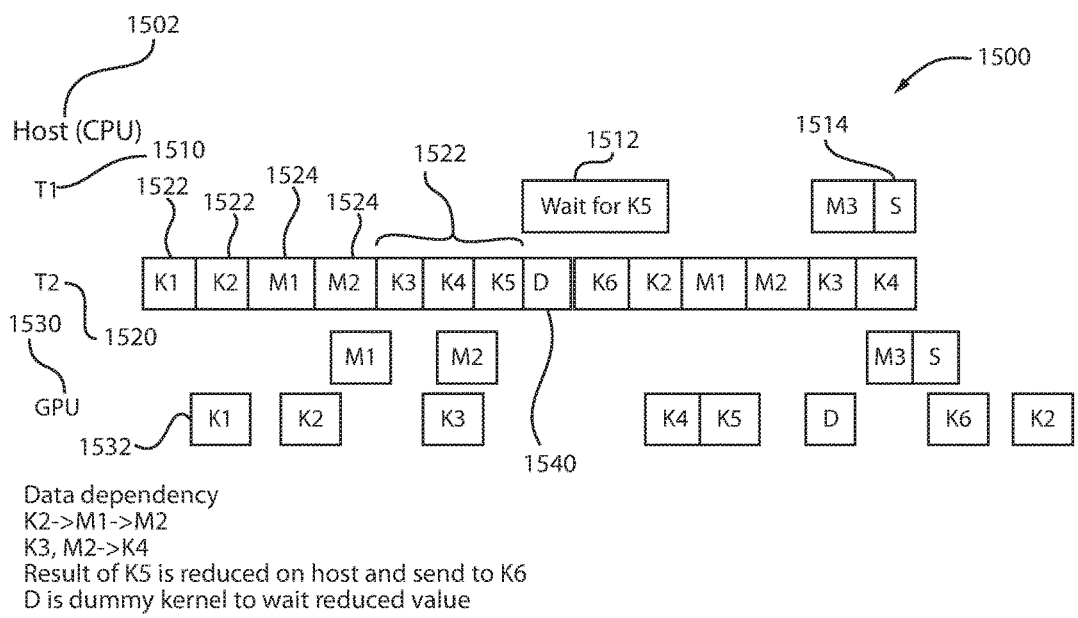
FIG. 15 illustrates CUDA overhead including a dummy kernel, in accordance with an embodiment of the present invention.

FIG. 15 illustrates CUDA overhead including a dummy kernel, in accordance with an embodiment of the present invention.

The overhead hiding implementation 1500 depicts a first thread 1510 and a second thread 1520 of a host (CPU) 1502. The GPU 1530 is invoked by the host 1502 to perform one or more operations of the host 1502. The first thread 1510 can be used for executing procedures on the host 1502 and synchronizing data streams, such as, e.g., CUDA streams for GPUs. The second thread 1520 can be used for managing the GPUs. The second thread 1520 includes a plurality of kernels 1522 (e.g., K1, K2, K3, K4, K5, K6) and a plurality of memory components/elements 1524 (e.g., M1, M2). The GPU 1530 can include a main stream 1532. Data dependency is present between K2, M1, and M2. Additionally, data dependency is present between K3, K4, and M2.

All the GPU kernels are launched asynchronously and executed when all the input data is ready. A first kernel overhead (e.g., K5) and a second kernel overhead (e.g., K6) are loaded in a queue of the second thread 1520. A dummy kernel overhead is loaded between the first and second kernel overheads (K5, K6) in the queue of second thread 1520. A waiting process 1512 is loaded in the queue of the first thread 1510, the waiting process 1512 remaining active until a previous kernel of the first and second kernel overheads ends. Memory copy overheads (e.g., M1, M2) related to the previous kernel in the queue of the first thread 1510 are then allocated. Moreover, a stop process 1514 is allocated in the queue of the first thread 1510, the stop process 1514 configured to stop a dummy kernel 1540, the dummy kernel 1540 related to the dummy kernel overhead.

The first and second kernel overheads (K5, K6) can be put or copied or transferred from the second thread 1520 in a queue of the main stream 1532 of the GPU 1530 while a previous kernel is executed on the GPU 1530 so that overheads are hidden behind kernel execution or memory copy. A dummy kernel 1540 is launched from the second thread 1520 in the main stream 1532 when synchronization with the host 1502 is required. The dummy kernel 1540 waits with a spin loop until a counter is set to a proper value. After the procedure on the CPU host 1502 is executed on the first thread 1510, the first thread 1510 launches a special kernel 1514 to set a counter to a proper value.

Figure 16:
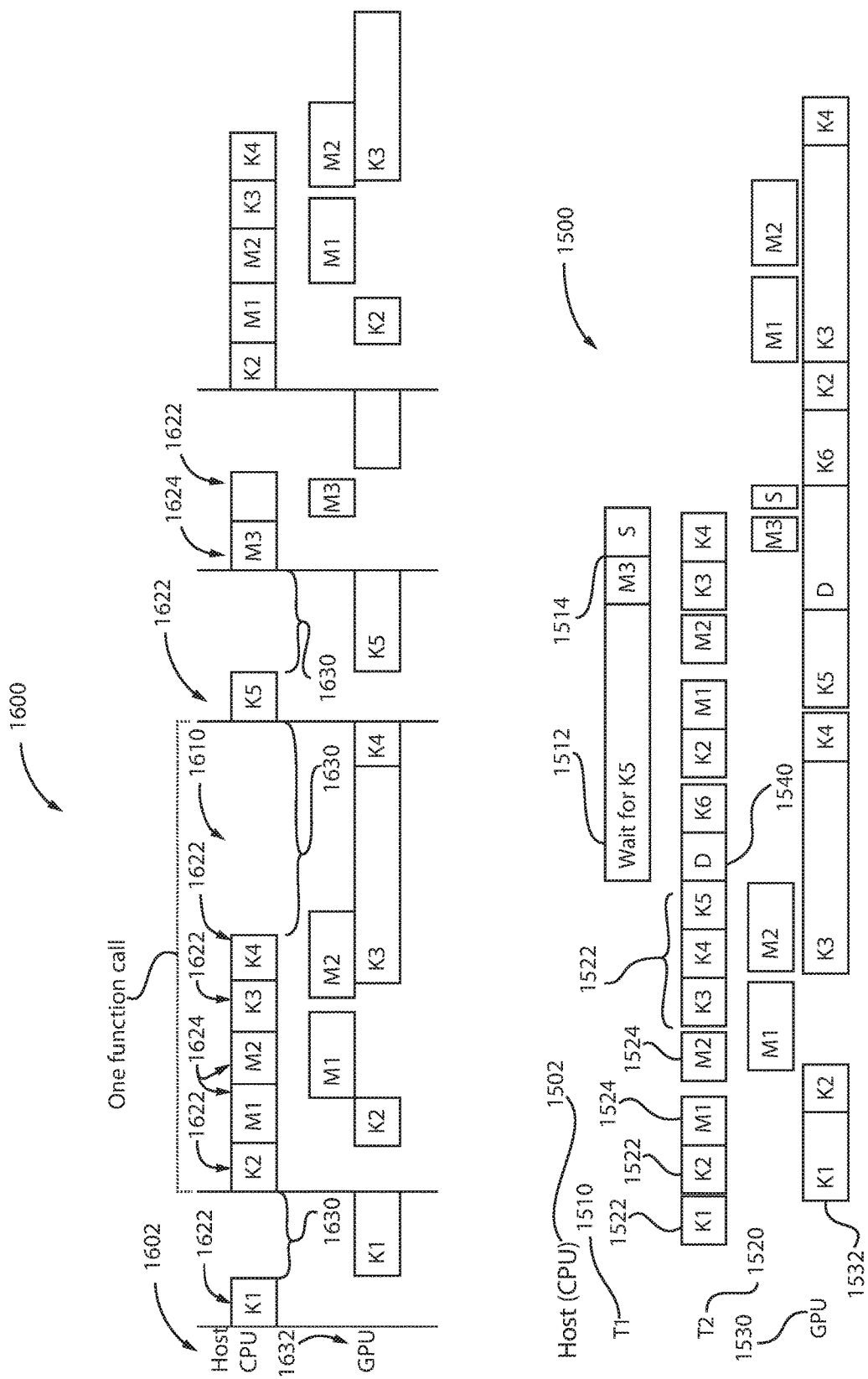
FIG. 16 is a comparison of implementations using and not using a dummy kernel, in accordance with an embodiment of the present invention.

FIG. 16 is a comparison of implementations using and not using a dummy kernel, in accordance with an embodiment of the present invention.

The base implementation 1600 is compared to the overhead hiding implementation 1500 of FIG. 15. In the base implementation 1600 there are no dummy kernels. The base implementation 1600 includes a thread 1610 for the host 1602 and a GPU 1632. The thread 1610 includes kernels 1622 (e.g., K1, K2, K3, K4, K5, K6) and memory components/elements 1624 (e.g., M1, M2). Sections of the thread 1610 include blocked portions or gaps 1630 between kernels 1622 and memory components/elements 1624. The gaps 1630 are created due to overheads of preparation of data or parameters. This causes blocks to the CPU core of the host 1602. Thus, large CUDA overheads can block the CPU core. As such, dummy kernels 1540 are used in the overhead hiding implementation 1500 to overcome this issue by using most of the GPU time to avoid or mitigate performance losses.

Figure 17:
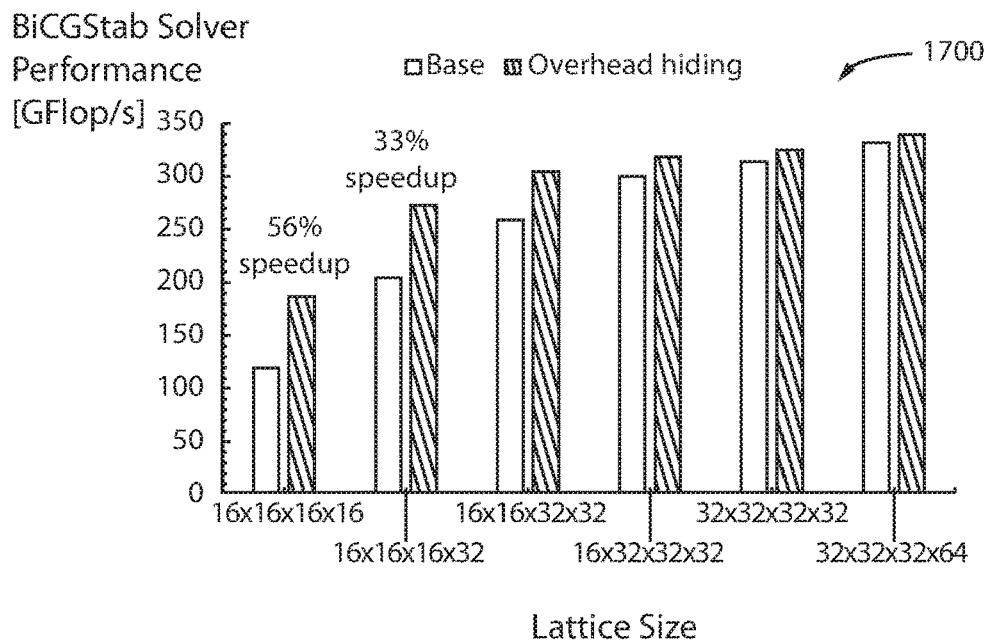
FIG. 17 illustrates performance of the BiCGStab solver of a lattice QCD simulation (with even-odd preconditioning), in accordance with an embodiment of the present invention.

FIG. 17 illustrates performance of the BiCGStab solver of a lattice QCD simulation 1700 (with even-odd preconditioning), in accordance with an embodiment of the present invention. As shown, improvement is greater for smaller lattice.

Figure 18:
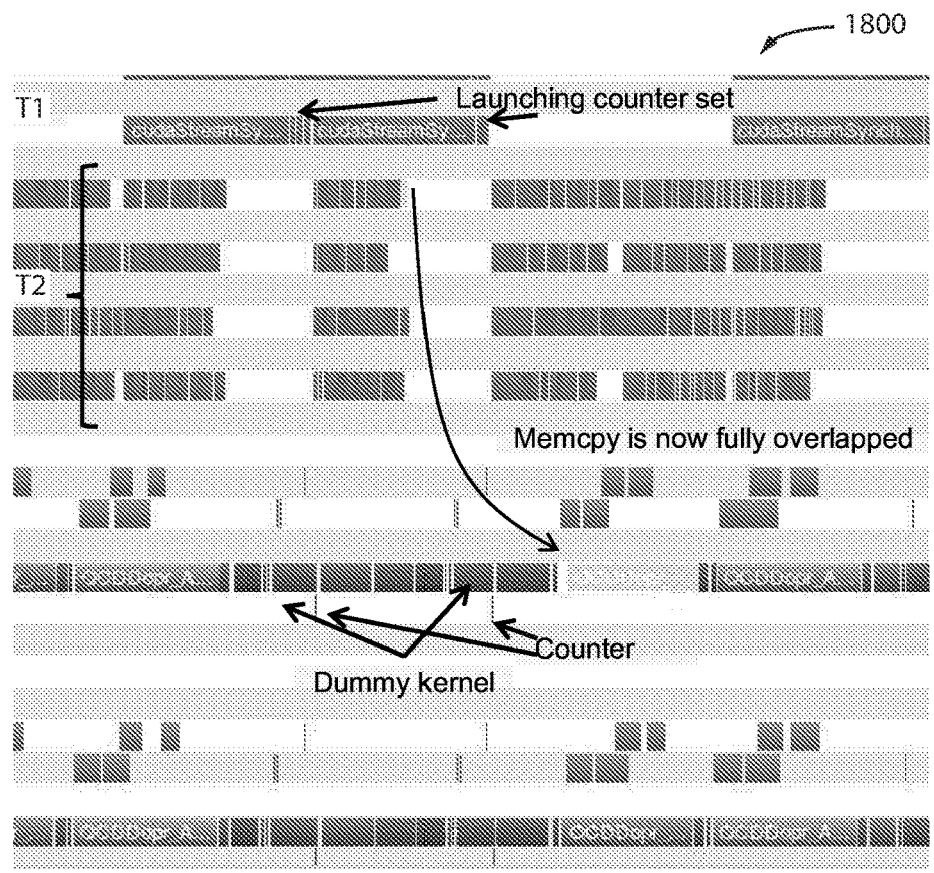
FIG. 18 illustrates an increase in the utilization ratio of a GPU by using a dummy kernel, in accordance with an embodiment of the present invention.

FIG. 18 illustrates an increase in the utilization ratio 1800 of a GPU by using a dummy kernel, in accordance with an embodiment of the present invention.

Figure 19:
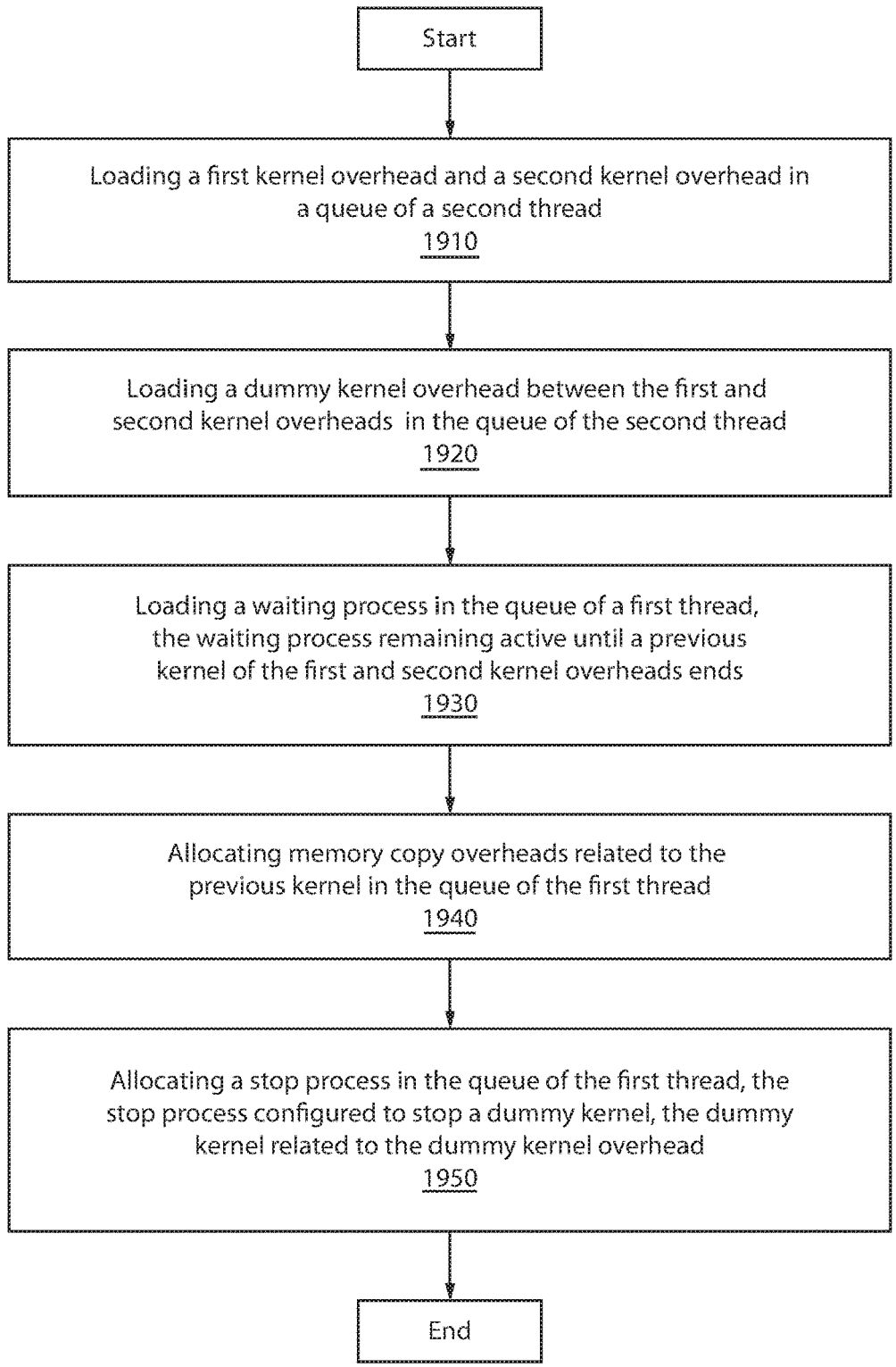
FIG. 19 is a block/flow diagram of an exemplary method for hiding overheads, in accordance with an embodiment of the present invention.

FIG. 19 is a block/flow diagram of an exemplary method for hiding overheads, in accordance with an embodiment of the present invention.

At block 1910, a first kernel overhead and a second kernel overhead are loaded in a queue of a second thread.

At block 1920, a dummy kernel overhead is loaded between the first and second kernel overheads in the queue of the second thread.

At block 1930, a waiting process is loaded in the queue of a first thread, the waiting process remaining active until a previous kernel of the first and second kernel overheads ends.

At block 1940, memory copy overheads related to the previous kernel in the queue of the first thread are allocated.

At block 1950, a stop process in the queue of the first thread is allocated, the stop process configured to stop a dummy kernel, the dummy kernel related to the dummy kernel overhead.

In summary, optimization techniques were tested to improve the performance of the Wilson-Dirac kernel on a Kepler GPU. The results of the optimization showed that the key optimization factor in improving lattice QCD is to increase memory access speed. The memory access speed of the Wilson-Dirac kernel is increased by decreasing data with gauge matrix parameterization and improving the bandwidth itself with the innermost memory access optimization proposed the one or more embodiments herein.

The main findings are summarized as follows:

The best number of threads is a multiple of the warp size, so the number of threads is set to the least common multiple of innermost size (Nx) and warp size (32).

Using the 12- or 8-real-number parameterization of the gauge matrix improves performance by decreasing global memory access, but these parameterizations are selected by referring to the results of performance measurements executed in advance.

Accessing aligned arrays improves memory access speed. Therefore, an algorithm is presented to keep the innermost memory access aligned by exchanging data between neighboring sites via shared memory or warp shuffle operation.

The optimized Wilson-Dirac kernels are implemented in, e.g., the BiCGStab solver program of a lattice QCD simulation. The Wilson-Dirac kernel and the BiCGStab solver are parallelized with multiple GPUs and multiple nodes of the OpenPOWER cluster by overlapping data transfer between host nodes and GPUs, MPI data exchanges, and calculations. Acceptable weak and strong scaling on POWER8 cluster up to 64 Tesla K80 GPUs were observed. However, degradation of the strong scaling performance of smaller lattice is also evident because of CUDA overheads. An overhead hiding implementation is proposed to overlap the CUDA overheads and the kernel execution by using extra threads on the host (CPU) and a spin loop kernel.

Figure 20:
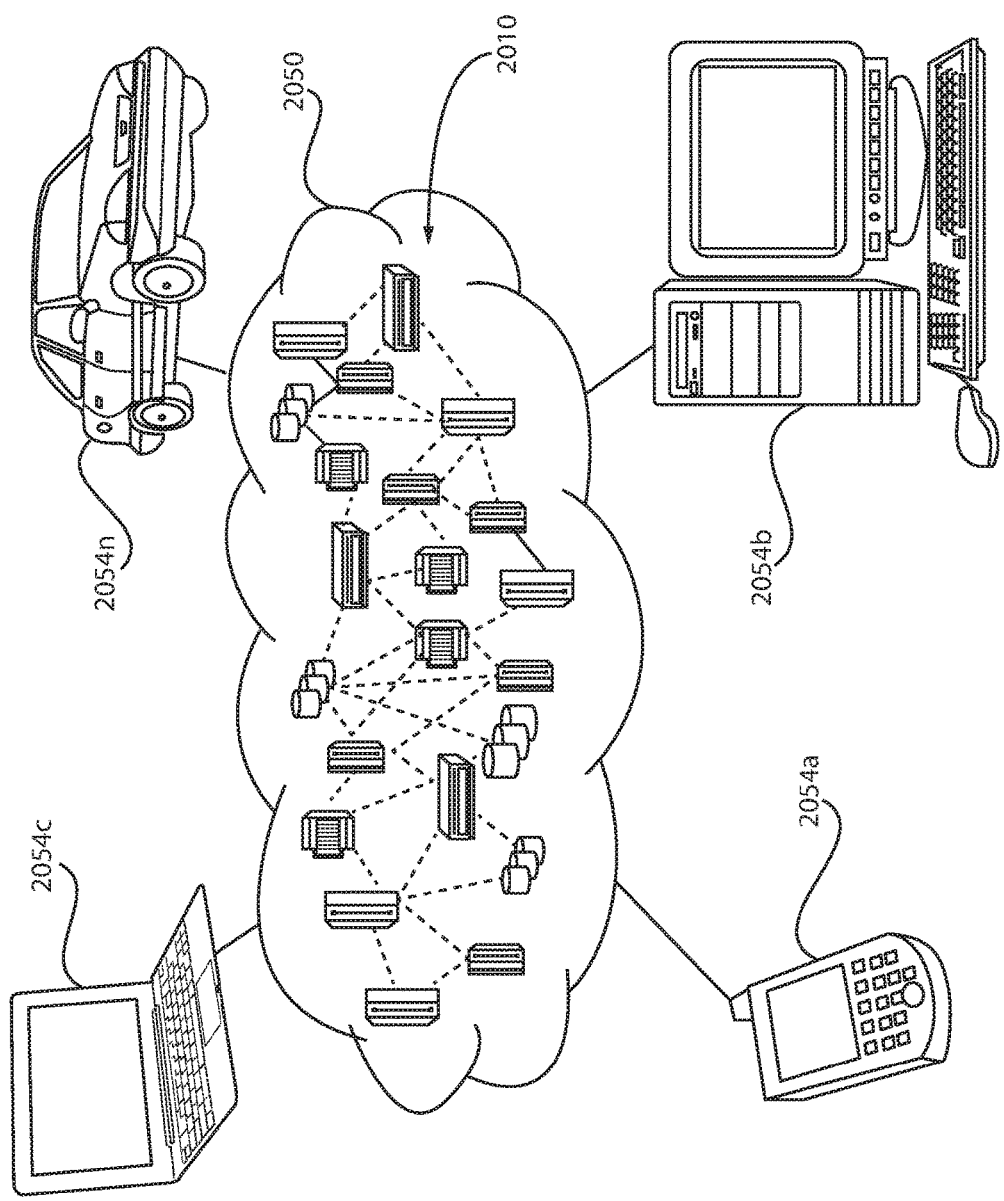
FIG. 20 is a block/flow diagram of an exemplary cloud computing environment, in accordance with an embodiment of the present invention.

FIG. 20 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 20, illustrative cloud computing environment 2050 is depicted for using a peer-to-peer seed assurance protocol. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N can communicate. Nodes 2010 can communicate with one another. They can be grouped (not shown) physically or virtually, in one or more networks, such as Private, Community, Public, or Hybrid clouds as described hereinabove, or a combination thereof. The network can be, e.g., a social network. This allows cloud computing environment 2050 to offer infrastructure, platforms and/or software as services for which a cloud consumer does not need to maintain resources on a local computing device. It is understood that the types of computing devices 2054A-N shown in FIG. 20 are intended to be illustrative only and that computing nodes 2010 and cloud computing environment 2050 can communicate with any type of computerized device over any type of network and/or network addressable connection (e.g., using a web browser).

Figure 21:
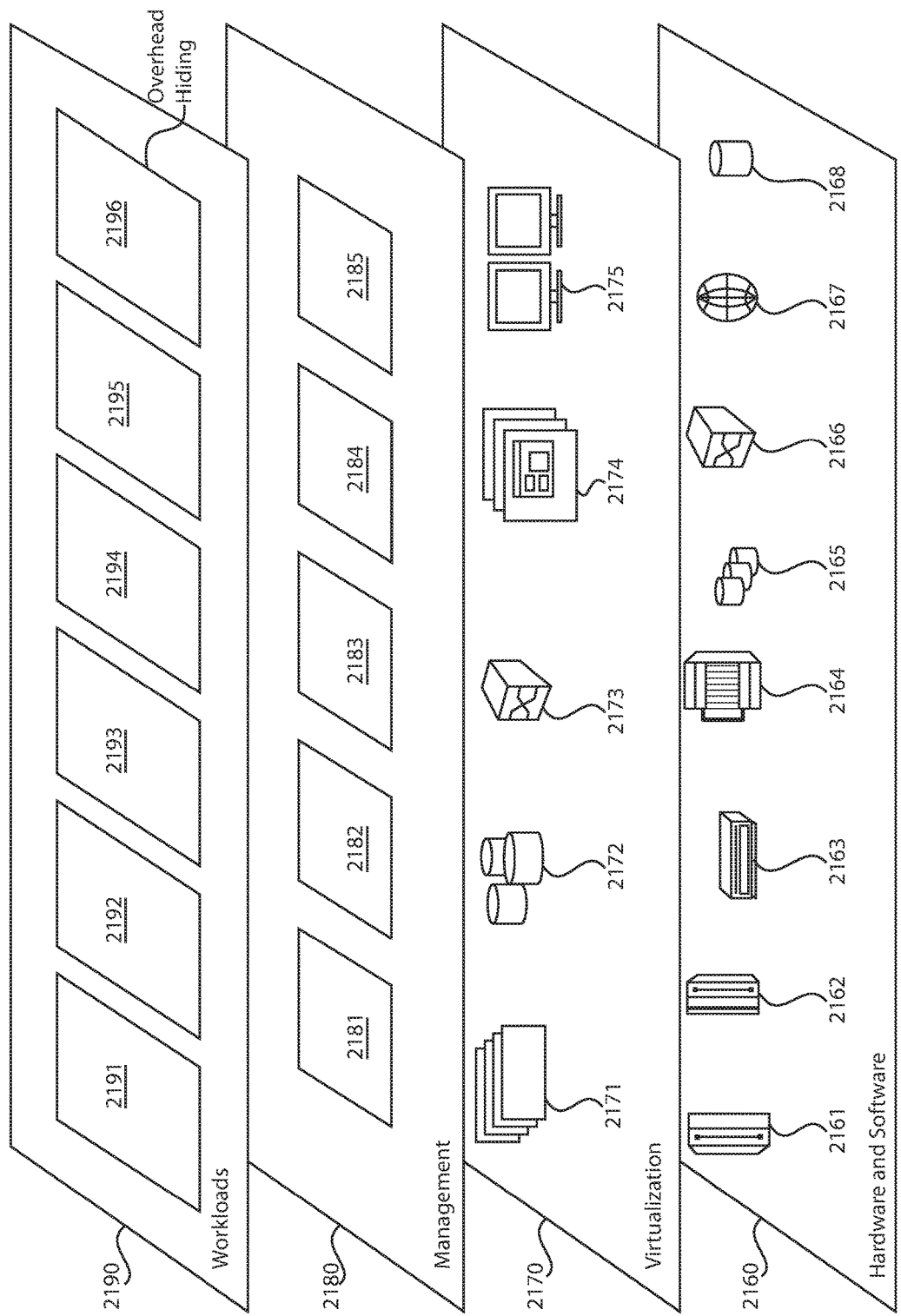
FIG. 21 is a schematic diagram of exemplary abstraction model layers, in accordance with an embodiment of the present invention.

FIG. 21 is a schematic diagram of exemplary abstraction model layers, in accordance with an embodiment of the present invention. It should be understood in advance that the components, layers, and functions shown in FIG. 21 are intended to be illustrative only and embodiments of the invention are not limited thereto. As depicted, the following layers and corresponding functions are provided:

Hardware and software layer 2160 includes hardware and software components. Examples of hardware components include: mainframes 2161; RISC (Reduced Instruction Set Computer) architecture based servers 2162; servers 2163; blade servers 2164; storage devices 2165; and networks and networking components 2166. In some embodiments, software components include network application server software 2167 and database software 2168.

Virtualization layer 2170 provides an abstraction layer from which the following examples of virtual entities may be provided: virtual servers 2171; virtual storage 2172; virtual networks 2173, including virtual private networks; virtual applications and operating systems 2174; and virtual clients 2175.

In one example, management layer 2180 may provide the functions described below. Resource provisioning 2181 provides dynamic procurement of computing resources and other resources that are utilized to perform tasks within the cloud computing environment. Metering and Pricing 2182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2183 provides access to the cloud computing environment for consumers and system administrators. Service level management 2184 provides cloud computing resource allocation and management such that required service levels are met. Service Level Agreement (SLA) planning and fulfillment 2185 provide pre-arrangement for, and procurement of, cloud computing resources for which a future requirement is anticipated in accordance with an SLA.

Workloads layer 2190 provides examples of functionality for which the cloud computing environment may be utilized. Examples of workloads and functions which may be provided from this layer include: mapping and navigation 2191; software development and lifecycle management 2192; virtual classroom education delivery 2193; data analytics processing 2194; transaction processing 2195; and overhead hiding 2196.

Still yet, any of the components or aspects of the present invention could be created, integrated, hosted, maintained, deployed, managed, serviced, etc. by a service supplier who offers to provide a method for overhead hiding. Thus, the components or aspects of the present invention describe a process for deploying, creating, integrating, hosting, maintaining, and/or integrating computing infrastructure, including integrating computer-readable code into the overhead hiding computer/processing system 100 (FIG. 1), wherein the code in combination with the overhead hiding computer/processing system 100 is capable of performing a method for providing a method for overhead hiding with respect to a product or service. In another embodiment, the embodiments of the invention provide for a business method that performs the process steps/blocks of the invention on a subscription, advertising, and/or fee basis. That is, a service supplier, such as a Solution Integrator, could offer to provide a method for overhead hiding with respect to a product or service. In this case, the service supplier can create, maintain, support, etc. a computer infrastructure that performs the process steps/blocks of the embodiments of the invention for one or more customers. In return, the service supplier can receive payment from the customer(s) under a subscription and/or fee agreement and/or the service supplier can receive payment from the sale of advertising content to one or more third parties.

The descriptions of the various embodiments of the present invention have been presented for purposes of illustration, but are not intended to be exhaustive or limited to the embodiments described. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments described herein.

The present invention relates to a system, a method, and/or a computer program product. The computer program product relates to a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method executed on a processor for hiding overheads on a parallel computing platform, the method comprising:
loading a first overhead process and a second overhead process into a queue of a second thread of a processor;
loading a dummy overhead process between the first overhead process and second overhead process into the queue of the second thread;

loading a waiting process into a queue of a first thread of the processor, the waiting process remaining active until a previous kernel associated with the first overhead process and second overhead process ends;

allocating memory copy overhead processes related to the previous kernel in the queue of the first thread;

allocating a stop process in the queue of the first thread, the stop process configured to stop a dummy kernel associated with the dummy overhead process; and copying the first overhead process and second overhead process to a queue of a main stream of an accelerator while the previous kernel executes on the accelerator.

2. The method of claim 1, wherein the first overhead process is a kernel launch overhead process and the second overhead process is a memory copy overhead process.

3. The method of claim 1, wherein the dummy overhead process is loaded when the first overhead process and second overhead process have a data dependency.

4. The method of claim 1, wherein the accelerator executes the first overhead process, the second overhead process, and the dummy overhead process.

5. The method of claim 4, wherein the accelerator is a graphical processing unit (GPU).

6. The method of claim 5, wherein the first overhead process and the second overhead process are hidden behind computations of the GPU.

7. The method of claim 6, wherein the first thread is an extra thread created on a host to be synchronized with the GPU.

8. The method of claim 1, wherein the dummy kernel waits in a spin loop until a counter is set to a predetermined value.

9. The method of claim 8, wherein, after a kernel procedure of the first thread is completed, the first thread launches a special kernel to set the counter to the predetermined value.

10. The method of claim 1, wherein the first overhead process and second overhead process relate to lattice sites of quantum chromodynamics (QCD) lattices.

11. A non-transitory computer readable storage medium comprising a computer readable program for hiding overheads on a parallel computing platform, wherein the computer readable program when executed on a computer causes the computer to perform the steps of:

loading a first overhead process and a second overhead process into a queue of a second thread of a processor;

loading a dummy overhead process between the first overhead process and second overhead process into the queue of the second thread;

loading a waiting process into a queue of a first thread of the processor, the waiting process remaining active until a previous kernel associated with the first overhead process and second overhead process ends;

allocating memory copy overhead processes related to the previous kernel in the queue of the first thread;

allocating a stop process in the queue of the first thread, the stop process configured to stop a dummy kernel associated with the dummy overhead process; and copying the first overhead process and second overhead process to a queue of a main stream of an accelerator while the previous kernel executes on the accelerator.

12. The non-transitory computer readable storage medium of claim 11, wherein the first overhead process is a kernel launch overhead process and the second overhead process is a kernel memory copy overhead process.

13. The non-transitory computer readable storage medium of claim 11, wherein the dummy overhead process is loaded when the first overhead process and second overhead process have a data dependency.

14. The non-transitory computer readable storage medium of claim 11, wherein the accelerator executes the first overhead process, the second overhead process, and the dummy overhead process.

15. The non-transitory computer readable storage medium of claim 14, wherein the accelerator is a graphical processing unit (GPU).

16. The non-transitory computer readable storage medium of claim 15, wherein the first overhead process and the second overhead process are hidden behind computations of the GPU.

17. The non-transitory computer readable storage medium of claim 16, wherein the first thread is an extra thread created on a host to be synchronized with the GPU.

18. The non-transitory computer readable storage medium of claim 11, wherein the dummy kernel waits in a spin loop until a counter is set to a predetermined value; and wherein, after a kernel procedure of the first thread is completed, the first thread launches a special kernel to set the counter to the predetermined value.

19. A computer system for hiding overheads on a parallel computing platform, the computer system comprising:

a memory; and a processor in communication with the memory, wherein the processor is configured to:

load a first overhead process and a second overhead process into a queue of a second thread of the processor;

load a dummy overhead process between the first overhead process and second overhead process into the queue of the second thread;

load a waiting process into a queue of a first thread of the processor, the waiting process remaining active until a previous kernel associated with the first overhead process and second overhead process ends;

allocate memory copy overhead processes related to the previous kernel in the queue of the first thread;

allocate a stop process in the queue of the first thread, the stop process configured to stop a dummy kernel associated with the dummy overhead process; and copy the first overhead process and second overhead process to a queue of a main stream of an accelerator while the previous kernel executes on the accelerator.

20. The computer system of claim 19, wherein the first overhead process is a kernel launch overhead process and the second overhead process is a kernel memory copy overhead process; and wherein the dummy overhead process is loaded when the first overhead process and second overhead process have a data dependency.

* * * * *